(12) United States Patent
Zhang et al.

(10) Patent No.: US 12,122,688 B2
(45) Date of Patent: Oct. 22, 2024

(54) AIR TREATMENT DEVICE AND CONTROL METHOD

(71) Applicant: Gree Electric Appliances, Inc. of Zhuhai, Zhuhai (CN)

(72) Inventors: Jianhua Zhang, Zhuhai (CN); Pingfa Zhou, Zhuhai (CN); Fengzhou Zheng, Zhuhai (CN); Zhenhua Lin, Zhuhai (CN); Jianfei Hou, Zhuhai (CN); Wei Wang, Zhuhai (CN); Shuntian Huo, Zhuhai (CN); Luqing Hou, Zhuhai (CN); Zhirong Lin, Zhuhai (CN); Guoliang Li, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 624 days.

(21) Appl. No.: 17/275,809

(22) PCT Filed: Jul. 30, 2019

(86) PCT No.: PCT/CN2019/098341
§ 371 (c)(1),
(2) Date: Mar. 12, 2021

(87) PCT Pub. No.: WO2020/073719
PCT Pub. Date: Apr. 16, 2020

(65) Prior Publication Data
US 2022/0048794 A1    Feb. 17, 2022

(30) Foreign Application Priority Data

Oct. 11, 2018   (CN) .......................... 201811182141.4

(51) Int. Cl.
*C02F 1/32*   (2023.01)
*C02F 1/00*   (2023.01)
(Continued)

(52) U.S. Cl.
CPC .............. *C02F 1/325* (2013.01); *C02F 1/008* (2013.01); *F24F 6/12* (2013.01); *F24F 11/0008* (2013.01);
(Continued)

(58) Field of Classification Search
CPC .... C02F 1/325; C02F 1/008; C02F 2201/005; C02F 2209/42; C02F 2303/04; F24F 6/12;
(Continued)

(56) References Cited

U.S. PATENT DOCUMENTS 3,469,785 A * 9/1969 Tobin .................. B05B 17/0615
239/4
3,901,443 A * 8/1975 Mitsui ................. B05B 17/0615
239/338
(Continued)

FOREIGN PATENT DOCUMENTS

CN           2184164 Y    11/1994
CN         201414951 Y     3/2010
(Continued)

OTHER PUBLICATIONS

International Search Report for corresponding application PCT/CN2019/098341 filed Jul. 30, 2019; Mail date Oct. 31, 2019.

*Primary Examiner* — Stephen Hobson
(74) *Attorney, Agent, or Firm* — CANTOR COLBURN LLP

(57) ABSTRACT

An air treatment device and a control method are provided. The air treatment device includes a water tank assembly, a water trough and a sterilization device. The sterilization device includes a sterilization portion, the sterilization portion is provided in the water trough, a water replenishing switch is provided between the water tank assembly and the water trough, and the water replenishing switch is config-
(Continued)

ured to control connection and disconnection between the water tank assembly and the water trough. The air treatment device further includes a control portion, and the control portion is capable of controlling an opening and closing of the sterilization portion according to an on-off state of the water replenishing switch to ensure a good sterilization effect.

14 Claims, 3 Drawing Sheets

(51) Int. Cl.
*F24F 6/12* (2006.01)
*F24F 11/00* (2018.01)
*F24F 6/00* (2006.01)
*F24F 140/00* (2018.01)

(52) U.S. Cl.
CPC .... *C02F 2201/005* (2013.01); *C02F 2209/42* (2013.01); *C02F 2303/04* (2013.01); *F24F 2006/006* (2013.01); *F24F 2006/008* (2013.01); *F24F 2140/00* (2018.01)

(58) Field of Classification Search
CPC ............. F24F 11/0008; F24F 2006/006; F24F 2006/008; F24F 2140/00; F24F 8/22; F24F 3/16; F24F 11/00; F24F 11/89; F24F 2110/00
See application file for complete search history.

(56) References Cited

U.S. PATENT DOCUMENTS

| | | | | |
|---|---|---|---|---|
| 3,989,042 A * | 11/1976 | Mitsui | .................. | A61M 11/005 310/317 |
| 4,031,171 A * | 6/1977 | Asao | .................. | B05B 17/0615 261/119.1 |
| 4,746,466 A * | 5/1988 | Takahashi | ........... | B05B 17/0615 261/81 |
| 5,121,541 A * | 6/1992 | Patrakis | .................. | B26B 19/40 30/41 |
| 5,464,572 A * | 11/1995 | Bonzi | ................. | B05B 17/0669 361/231 |
| 5,645,769 A * | 7/1997 | Tamaru | .................... | B01F 31/80 261/DIG. 4 |
| 5,677,982 A * | 10/1997 | Levine | ...................... | F24F 6/00 392/405 |
| 5,832,176 A * | 11/1998 | Jung | ........................ | A61L 2/04 261/142 |
| 5,859,952 A * | 1/1999 | Levine | ..................... | F24F 6/18 239/102.1 |
| 6,053,482 A * | 4/2000 | Glenn | ..................... | F24F 6/043 261/DIG. 46 |
| 6,244,576 B1 * | 6/2001 | Tsai | ......................... | F24F 6/02 261/DIG. 65 |
| 7,686,285 B2 * | 3/2010 | Murray | ............... | B05B 17/0615 261/81 |
| 7,775,459 B2 * | 8/2010 | Martens, III | ........ | B05B 17/0684 128/200.14 |
| 9,776,144 B1 * | 10/2017 | Lu | ......................... | F24F 11/0008 |
| 10,012,402 B2 * | 7/2018 | Cai | ...................... | F24F 11/0008 |
| 10,639,666 B2 * | 5/2020 | Kim | ...................... | B05B 1/02 |
| 11,365,895 B2 * | 6/2022 | Seo | ........................ | F24F 6/14 |
| 2004/0020487 A1 * | 2/2004 | Koch | .................. | A61M 16/164 261/130 |
| 2007/0216259 A1 * | 9/2007 | Kang | ...................... | F24F 6/12 310/353 |
| 2008/0223953 A1 * | 9/2008 | Tomono | ............... | A61M 11/005 128/200.16 |
| 2012/0319311 A1 * | 12/2012 | Nutter | ...................... | A61L 9/20 250/437 |
| 2013/0175362 A1 * | 7/2013 | Lee | .......................... | F24F 6/14 239/302 |
| 2015/0084214 A1 * | 3/2015 | Wilson | ..................... | F04F 5/16 261/32 |
| 2015/0330643 A1 * | 11/2015 | Lee | ........................... | F24F 6/06 210/243 |
| 2017/0008679 A1 * | 1/2017 | Duvall | ...................... | F24F 6/14 |
| 2017/0082306 A1 * | 3/2017 | Murakami | ............... | F24F 6/00 |
| 2020/0096213 A1 * | 3/2020 | Liang | ........................ | F24F 6/12 |
| 2020/0284451 A1 * | 9/2020 | Yang | ........................ | F24F 6/02 |
| 2020/0340694 A1 * | 10/2020 | Yang | ........................ | F24F 6/14 |
| 2020/0370769 A1 * | 11/2020 | Yang | ........................ | F24F 6/12 |
| 2020/0393149 A1 * | 12/2020 | Yang | ........................ | F24F 6/14 |

FOREIGN PATENT DOCUMENTS

| | | | | |
|---|---|---|---|---|
| CN | 203928257 A | | 11/2014 | |
| CN | 105289159 A | * | 2/2016 | ............. F04D 25/08 |
| CN | 205227653 U | * | 5/2016 | |
| CN | 205261821 A | | 5/2016 | |
| CN | 105692778 A | | 6/2016 | |
| CN | 105909834 A | | 8/2016 | |
| CN | 205825319 U | | 12/2016 | |
| CN | 106482271 A | | 3/2017 | |
| CN | 106839293 A | * | 6/2017 | |
| CN | 107101307 A | | 8/2017 | |
| CN | 206387053 U | * | 8/2017 | |
| CN | 206669953 U | * | 11/2017 | |
| CN | 108017114 A | | 5/2018 | |
| CN | 108119976 A | * | 6/2018 | ............. F24F 13/20 |
| CN | 207855995 U | * | 9/2018 | |
| CN | 109405110 A | | 3/2019 | |
| CN | 110145831 A | * | 8/2019 | ............. F24F 13/24 |
| JP | 10122611 A | * | 5/1998 | |
| JP | 3060967 B2 | * | 7/2000 | |
| JP | 2002098369 A | * | 4/2002 | |
| JP | 2008309357 A | | 12/2008 | |
| JP | 2016080336 A | * | 5/2016 | |
| KR | 1020050047369 | | 5/2005 | |
| WO | 2012086204 A1 | | 6/2012 | |

* cited by examiner

AIR TREATMENT DEVICE AND CONTROL METHOD

CROSS REFERENCE TO RELATED APPLICATIONS

The disclosure claims priority to Chinese Patent Application No. 201811182141.4, filed on Oct. 11, 2018 and entitled "Air Treatment Device and Control Method", the disclosure of which is hereby incorporated by reference in its entirety.

TECHNICAL FIELD

The disclosure relates to the technical field of air treatment, in particular to an air treatment device and a control method.

BACKGROUND

An ultraviolet sterilization method for a humidifier is only aimed at sterilization when the humidifier is started up and operated. According to the characteristics of a deep ultraviolet generator, such as an LED ultraviolet sterilization lamp, the photoelectric conversion rate is less than 5%, that is to say, a large amount of electric energy becomes heat to be emitted, and meanwhile, a large amount of heat energy also damages the service life of an ultraviolet lamp. Therefore, the deep ultraviolet generator cannot be lighted for a long time, the common practice in the industry is intermittent work, the ultraviolet lamp is effectively protected, but the slow-flowing water sterilization effect on the humidifier is limited.

SUMMARY

Some embodiments of the disclosure provide an air treatment device having a good sterilization effect and a control method.

On one hand, the disclosure adopts the following technical solution.

An air treatment device includes a water tank assembly, a water trough and a sterilization device. The sterilization device includes a sterilization portion, the sterilization portion is provided in the water trough, a water replenishing switch is provided between the water tank assembly and the water trough, and the water replenishing switch is configured to control connection and disconnection between the water tank assembly and the water trough. The air treatment device further includes a control portion, and the control portion is capable of controlling an opening and closing of the sterilization portion according to an on-off state of the water replenishing switch.

In some embodiments, the air treatment device further includes a water level detection device for detecting a water level in the water trough, the control portion is capable of controlling the on-off state of the water replenishing switch according to the water level detected by the water level detection device.

In some embodiments, the water replenishing switch includes a drain valve and a solenoid valve, the solenoid valve is connected to the control portion, the control portion is capable of controlling the solenoid valve to drive an action of the drain valve, so as to realize connection or disconnection between the water tank assembly and the water trough.

In some embodiments, the air treatment device further includes an atomizer and a mist collecting structure, the mist collecting structure forming a mist collecting space, and at least a part of the sterilization portion is located in the mist collecting space.

In some embodiments, the air treatment device includes a humidifier.

On the other hand, the disclosure adopts the following technical solution.

In a control method of an air treatment device, the air treatment device includes a water tank assembly, a water trough and a sterilization device. The sterilization device includes a sterilization portion, the sterilization portion is provided in the water trough, a water replenishing switch is provided between the water tank assembly and the water trough, and the water replenishing switch is configured to control connection and disconnection between the water tank assembly and the water trough. The control method includes that:

the opening and closing of the sterilization portion is controlled at least according to an on-off state of the water replenishing switch.

In some embodiments, the control method of the air treatment device includes a startup control process and a common operation control process, and in the common operation control process, the control method includes that:

when the water trough is in a water replenishing state and the water replenishing switch is in an on state, the sterilization portion is controlled to be in a continuous working state; or, when the water trough is in a normal water quantity state and the water replenishing switch is in an off state, the sterilization portion is controlled to be in an intermittent working state; or, when the water trough is in a water replenishing state and the water replenishing switch is in an on state, the sterilization portion is controlled to be in a continuous working state, when the water trough is in a normal water quantity state and the water replenishing switch is in an off state, the sterilization portion is controlled to be in an intermittent working state.

In some embodiments, the intermittent working state is that the sterilization portion works for a second duration every first duration.

In some embodiments, in the startup control process, the control method includes that:

when the air treatment device is changed from a shutdown state to a startup state, the water level in the water trough is detected;

if the water level in the water trough does not reach a set value, the water replenishing switch is controlled to be turned on, when the water level in the water trough reaches the set value, the water replenishing switch is controlled to be turned off, and the sterilization portion is controlled to enter the common operation control process after working for a predetermined duration; and if the water level in the water trough is higher than or equal to the set value, the sterilization portion is controlled to enter the common operation control process after working for a predetermined duration.

In some embodiments, the predetermined duration is greater than the second duration.

In some embodiments, the air treatment device includes an atomizer.

In the startup control process, the atomizer is in a closed state; and/or, in the common operation control process, the atomizer is in an open state.

In some embodiments, the control method includes: controlling the sterilization device to be closed when the water tank assembly is separated from the water trough.

The disclosure provides an air treatment device and a control method. The air treatment device is capable of controlling an opening and closing of a sterilization portion according to an on-off state of a water replenishing switch so as to ensure a good sterilization effect. For example, when the water replenishing switch is turned on, a water tank assembly replenishes water to a water trough. At this time, the sterilization device is opened so as to effectively perform sterilization treatment on the replenished water to improve the sterilization effect, ensure the sterility of the water in the water trough, and provide more effective guarantee for the body health of users.

BRIEF DESCRIPTION OF THE DRAWINGS

The above and other objectives, features and advantages of the disclosure will be clearer through the following description of the embodiments of the disclosure with reference to the drawings. In the drawings.

In the figures, 1, water trough; 11, water level detection device; 111, float; 112, detection plate; 2, water tank assembly; 21, water replenishing switch; 211, drain valve; 212, solenoid valve; 22, mist outlet passage; 3, base; 4, mist collecting structure; 41, plate-like structure; 42, mist collecting space; 5, sterilization device; 51, sterilization portion; 6, fan; 7, atomizer; 8, control portion.

DETAILED DESCRIPTION OF THE EMBODIMENTS

The following describes the disclosure based on the embodiments, but the disclosure is not limited to these embodiments. Those of ordinary skill in the art should understand that the drawings provided herein are for illustrative purposes, and the drawings are not necessarily drawn to scale.

Unless the context clearly requires, the words "including", "containing" and the like in the entire specification and claims should be interpreted as the meaning of inclusive rather than exclusive or exhaustive meaning, that is, "including but not limited to" meaning.

In the description of the disclosure, it should be understood that the terms "first", "second", etc. are for descriptive purposes only, and cannot be understood as indicating or implying relative importance. In addition, in the description of the disclosure, unless otherwise stated, the meaning of "multiple" is two or more.

Figure 1:
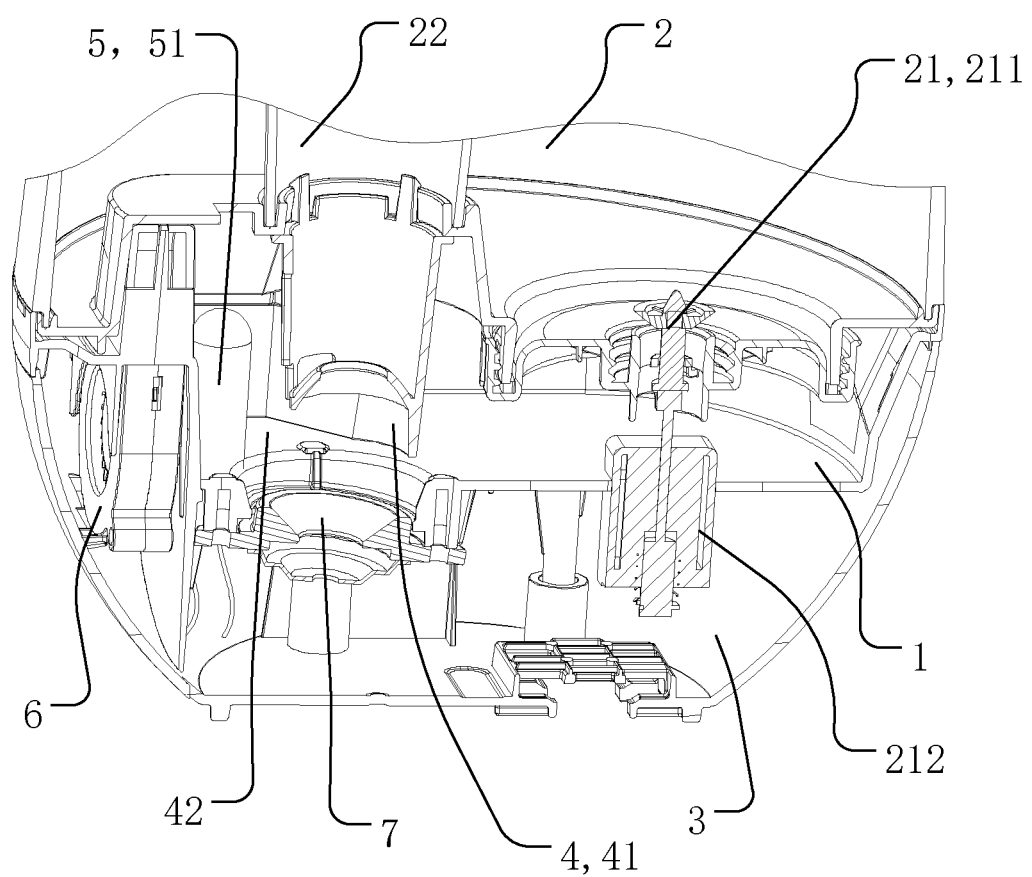
FIG. 1 shows a partial cross-section view of a humidifier according to a specific embodiment of the disclosure.
Figure 2:
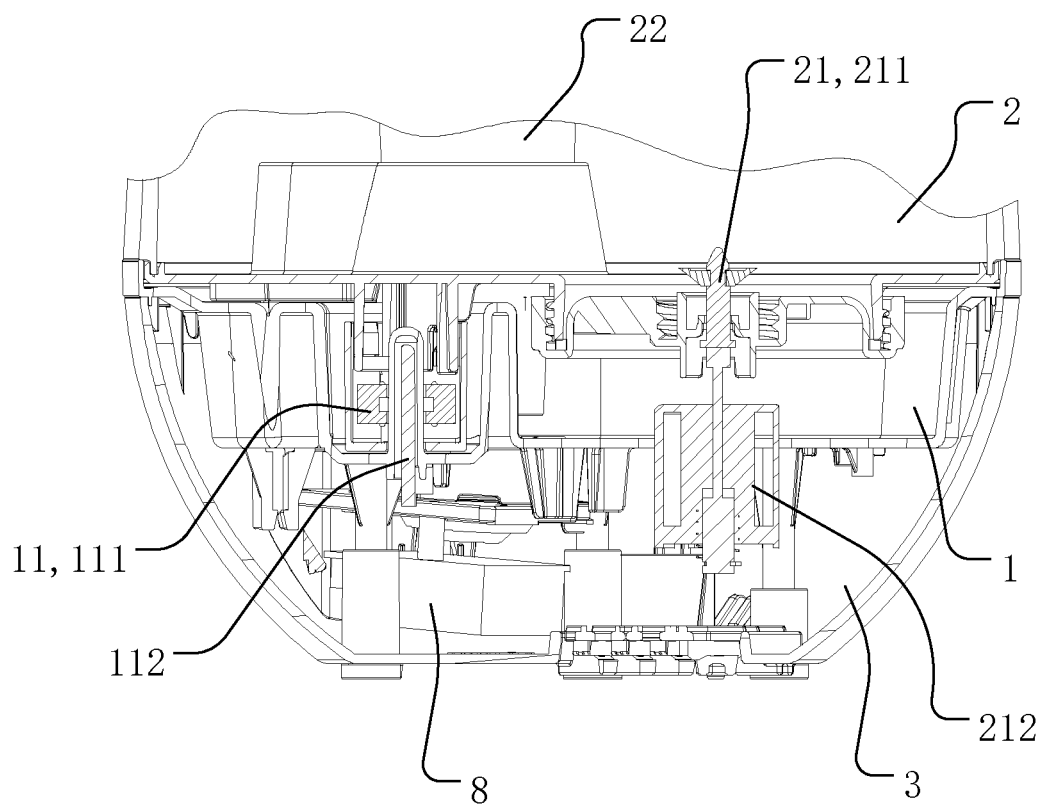
FIG. 2 shows another partial cross-section view of a humidifier according to a specific embodiment of the disclosure.
Figure 3:
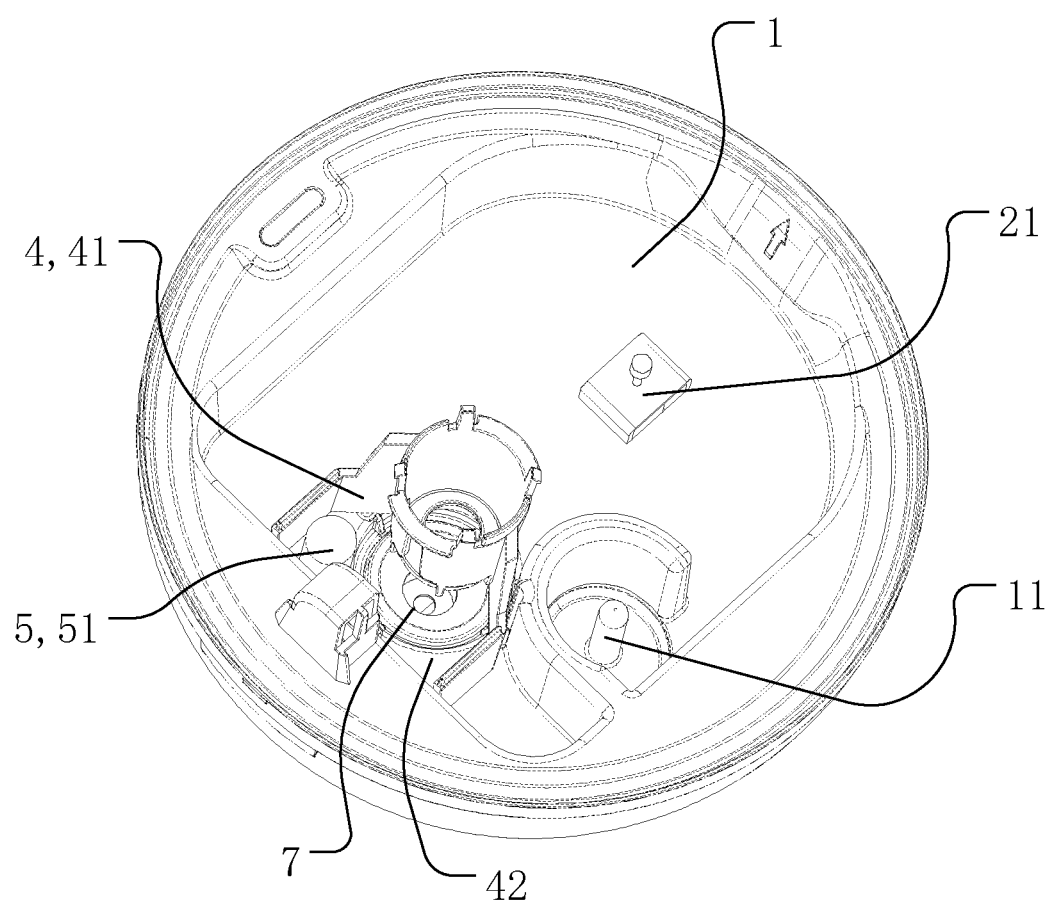
FIG. 3 shows a schematic structural view of a water trough of a humidifier according to a specific embodiment of the disclosure.

Referring to FIG. 1 to FIG. 3, the disclosure provides an air treatment device, such as a humidifier, including a water tank assembly 2, a water trough 1 and a sterilization device 5. The sterilization device 5 includes a sterilization portion 51. For example, the sterilization portion 51 is an ultraviolet lamp. The sterilization portion 51 is provided in the water trough 1. A water replenishing switch 21 is provided between the water tank assembly 2 and the water trough 1. The water replenishing switch 21 is configured to control connection and disconnection between the water tank assembly 2 and the water trough 1. The air treatment device further includes a control portion 8. The control portion 8 is capable of controlling an opening and closing of the sterilization portion 51 according to an on-off state of the water replenishing switch 21. For example, when the water replenishing switch 21 is turned on, the sterilization portion 51 is opened to sterilize, replenished water is effectively sterilized, and the problem of secondary pollution of water in the water trough 1 caused by the replenished water is solved.

Referring to FIG. 1 to FIG. 3, the humidifier is further provided with a mist collecting structure 4, an atomizer 7, a fan 6 and a mist outlet passage 22, the mist collecting structure 4 forms a mist collecting space 42, the atomizer 7 is located in the mist collecting space 42, an air outlet of the fan 6 communicates with the mist collecting space 42, the mist collecting space 42 communicates with the mist outlet passage 22, water mist generated by the atomizer 7 is collected in the mist collecting space 42, air generated by the fan 6 is sent into the mist collecting space 42, and the air discharges the water mist out of the humidifier along the mist outlet passage 22 to achieve a humidification effect.

Referring to FIG. 1 to FIG. 3, at least a part of the sterilization portion 51 is located in the mist collecting space 42, or entirely within the mist collecting space 42, so as to sterilize water and water mist within the mist collecting space 42. For example, the sterilization portion 51 is an ultraviolet lamp, the sterilization device 5 includes an ultraviolet light source and a lamp cover, and the ultraviolet light source is located within the lamp cover. For example, the ultraviolet light source is a mercury lamp. The mercury lamp is separated from the water and water mist in the mist collecting space 42 by the lamp cover, so that direct contact between the mercury lamp and the water or water mist is avoided, and the possibility that the mercury lamp is easily damaged due to shock cooling and shock heating is reduced. By virtue of the sterilization effect of the ultraviolet lamp on water and water mist, the water mist discharged by the humidifier is ensured to be healthy, physical discomfort of a user caused by inhalation of the water mist with bacteria into the lungs is avoided, and a good living space is provided for the user.

In some embodiments, referring to FIG. 1 to FIG. 3, the sterilization device 5 and the atomizer 7 are arranged at the bottom of the water trough 1, the mist collecting structure 4 is covered above the sterilization portion 51 and the atomizer 7, the atomizer 7 and the sterilization portion 51 are covered in the mist collecting space 42, and the sterilization device 5 is arranged close to the atomizer 7. For example, the sterilization portion 51 is located at the edge position of the atomizer 7. Therefore, light is well irradiate the water in the atomizer 7, and the water mist generated by the atomizer 7 is better sterilized. In addition, the sterilization portion 51 is a hemispherical LED lamp, a U-shaped ultraviolet lamp, a columnar ultraviolet lamp and the like, the sterilization portion is vertically arranged or transversely arranged, and in some embodiments, the sterilization portion 51 is vertically arranged, and configured as a vertically extending columnar structure, in some embodiments a columnar structure, so as to be convenient to process and manufacture, that is, the sterilization portion 51 extends from the bottom of the water trough 1 in the direction of outward flow of water mist. It is better ensured that the light well illuminate each corner of the mist collecting space 42, and a better sterilization effect is achieved.

The mist collecting structure 4 is configured, for example, as a cylindrical structure, the interior of which constitutes a mist collecting space 42, and the atomizer 7 is located, at least partially, or entirely, within the cylindrical structure to ensure that the mist generated by the atomizer 7 fully enters the mist collecting space 42 and then exits the humidifier through the mist outlet passage 22 to ensure a humidifying effect. Or, referring to FIG. 1 to FIG. 3, the mist collecting structure 4 includes a plate-like structure 41 configured to be curved or bent. In some embodiments, there are two plate-like structures 41. The two plate-like structures 41 are configured as mist collecting structures 4 bending to the same side. At least part of the structure of the atomizer 7 is located between the two plate-like structures 41, and a mist collecting space 42 is formed between the two plate-like structures 41 41. Or, a sidewall of the water trough 1 of the humidifier or other structures matched with the mist collecting structure 4 form the mist collecting space 42 which is closed in a circumferential direction. The mist collecting space 42 enables the water mist not to be diffused to the outside, and the water mist flows to the mist outlet passage 22 through air blown out by the air outlet. The mist collecting space 42 is formed by the two plate-like structures 41 in the present embodiment, and the mist collecting space is simple in structure and convenient to process and manufacture. It is to be noted that the mist collecting structure 4 is not limited to the above-mentioned structure, as long as a relatively closed area is enclosed in the water trough 1, it is annularly enclosed, or it is semi-annularly engaged with the side wall of the water tank 1 to form a relatively closed area, and it also be of a special complex shape, as long as the closure is formed.

Referring to FIG. 1 to FIG. 3, the mist outlet passage 22 is located in the water tank assembly 2 to communicate the mist collecting space 42 and the outside of the humidifier so that water mist is discharged out of the humidifier through the mist outlet passage 22. In addition, the mist collecting structure 4 is connected to the water tank assembly 2 through a buckle connection, or through a fastener connection, or an adhesive connection, or a welding connection, or the mist collecting structure 4 is integrally formed with the water tank assembly 2. The overall structural strength and stability of the mist collecting structure 4 and the water tank assembly 2 are better ensured, the tightness of the mist collecting space 42 is ensured, and leakage of water mist from the junction of the mist collecting structure 4 and the water tank assembly 2 is avoided.

The humidifier further includes a water level detection device 11 for detecting a water level in the water trough 1. Referring to FIG. 1 to FIG. 3, the control portion 8 is capable of controlling an on-off state of the water replenishing switch 21 according to the water level detected by the water level detection device 11. For example, when the water level in the water trough 1 is lower than a set value, the control portion 8 controls the water replenishing switch 21 to be turned on to replenish water to the water trough 1 to ensure a humidification effect.

Specifically, referring to FIG. 1 to FIG. 3, the water replenishing switch 21 includes a drain valve 211 and a solenoid valve 212. The solenoid valve 212 is connected to the control portion 8, and the control portion 8 is capable of controlling the solenoid valve 212 to drive an action of the drain valve 211 so as to realize connection or disconnection between the water tank assembly 2 and the water trough 1, and the structure is simple and reliable. It is to be noted that the water replenishing switch 21 also realize a water replenishing function through other structural forms such as a magnet and a water pump.

The disclosure also provides a control method of an air treatment device. For example, the control method of the humidifier includes that: the opening and closing of the sterilization portion 51 is controlled at least according to the on-off state of the water replenishing switch 21, that is, in the control method, the water replenishing switch 21 and the sterilization device 5 are controlled in a linkage manner so as to achieve a better sterilization effect. In addition, when the water tank assembly 2 and the water trough 1 are in a separated state, the control portion 8 controls the sterilization device 5 to be closed. For example, a sensor (not shown in the figure) is arranged at the junction of the water tank assembly 2 and the water trough 1 and detects whether the water tank assembly 2 and the water trough 1 are separated, the ultraviolet lamp is controlled to be closed, and damage to a user caused by the ultraviolet lamp when the water tank assembly 2 is lifted is avoided.

Referring to FIG. 1 to FIG. 3, the control method of the humidifier includes a startup control process and a common operation control process. The startup control process is a control process between the startup of the humidifier and the entering of the common operation control process. In the startup control process, when the humidifier is changed from a shutdown state to a startup state, the water level detection device 11 detects the water level in the water trough 1, if the water level in the water trough 1 does not reach a set value, the water replenishing switch 21 is controlled to be turned on, when the water level in the water trough 1 reaches the set value, the water replenishing switch 21 is controlled to be turned off and the ultraviolet lamp is controlled to be turned on at the same time, the ultraviolet lamp is controlled to be turned off after lasting for a predetermined duration, and a common operation control process is entered. The predetermined duration is 0-10 min, for example 3 min, sterilization of entering first water flow is realized, and the sterility of the first water flow is ensured. If the water level in the water trough 1 is higher than or equal to the set value, the ultraviolet lamp is directly controlled to be turned on for 3 min, and then the common operation control process is entered. In addition, in the startup control process, if the water quantity in the water tank 1 is too small, the atomizer 7 is damaged due to working of the atomizer 7, and power is also wasted, so that the atomizer 7 is in a closed state in the startup control process. Moreover, if the water level in the water trough 1 does not reach a set value during startup, water needs to be replenished, the ultraviolet lamp is in a closed state, and if the atomizer 7 works, water mist with bacteria is easily sprayed out, thereby affecting the physical health of users.

In the common operation control process, referring to FIG. 1 to FIG. 3, the atomizer 7 is in an on state to provide the user with water mist for humidification. When the water trough 1 is in a water replenishing state, that is, the water level detection device 11 detects that the water level in the water trough 1 is lower than a set value, the water replenishing switch 21 is in an on state, and the control portion 8 controls the sterilization portion 51 to be in a continuous working state so as to sterilize the replenished water, thereby ensuring that the newly replenished water is effectively sterilized and effectively avoiding the problem of secondary water pollution of the water trough 1 caused by Brownian motion of water molecules. When the water trough 1 is in a normal water quantity state, that is, the water level detection device 11 detects that the water level in the water trough 1 is equal to or higher than a set value, the water replenishing switch 21 is in an off state, and the control portion 8 controls the sterilization portion 51 to be in an intermittent working state. For example, the sterilization portion 51 works for a second duration every first duration, the first duration is 0-5 min, and the second duration is 0-5 min. For example, the first duration is 50 s, and the second duration is 10 s, so that real-time sterilization is guaranteed, and good heat dissipation is achieved.

It is to be noted that it is that the predetermined duration be longer than the second duration in order to better kill bacteria in the water tank and to avoid bacteria in the water mist sprayed from the humidifier just when the humidifier is started up, since the humidifier has a relatively high probability of growing bacteria in the water trough when the humidifier is shut down.

In a specific embodiment, referring to FIG. 1 to FIG. 3, the humidifier includes a water tank assembly 2 and a base 3. The base 3 is provided with a water trough 1 for installing various components and containing water for direct atomization. A drain valve assembly (i.e. water replenishing switch 21) is arranged on the water tank assembly 2 and includes a drain valve 211 and a solenoid valve 212, water replenishing is performed when the water level of the water trough 1 is lower than a set water level, the solenoid valve 212 is installed on the water trough 1 corresponding to the drain valve 211, and the drain valve 211 is jacked up to achieve a water replenishing function after being energized. The water tank assembly 2 is further provided with a mist collecting structure 4, and the mist collecting structure 4 is connected to the water tank assembly 2 through a buckle (also be integrally formed with the water tank assembly 2). The water trough 1 is provided with an atomizer 7 for spraying water into water mist and quickly humidifying. An ultraviolet lamp is arranged beside the atomizer 7, after the water tank assembly 2 is placed in place, the mist collecting structure 4 covers the atomizer 7 and the ultraviolet lamp. At this time, water in the water trough 1 does not pass through a clearance between the mist collecting structure 4 and the water trough 1 to form a relatively closed mist collecting space 42 for sterilization. When the humidifier operates, water for direct atomization is gathered above the atomizer 7, and the ultraviolet lamp lightens to irradiate water in the range for sterilization. Since the penetration power of ultraviolet rays is poor, in an embodiment the energy is concentrated in the mist collecting space 42 defined by the mist collecting structure 4, and the energy loss is small. Meanwhile, due to the fact that the ultraviolet lamp is close to the atomizer 7, the ultraviolet lamp is irradiated to any corners above the atomizer 7, a good sterilization effect is achieved on water in the water trough 1, the first water mist carrying bacteria after starting up is prevented from being sprayed out, the ultraviolet sterilization humidifier with the structure ensure that each drop of water is subjected to ultraviolet irradiation sterilization before being atomized, secondary pollution is avoided, and humidification is healthier. In addition, the water trough 1 in the disclosure is simple in structure and high in production and manufacturing efficiency, and the user is conveniently clean the water trough 1 after taking down the water tank assembly 2. After the humidifier is powered on, a float detection plate structure (i.e. water level detection device 11) is configured to detect the water level of the water trough 1 and includes a float 111 and a detection plate 112. When the water level does not reach a set value, the solenoid valve 212 is turned on to push the drain valve 211 to be turned on for water replenishment. When the water level of the water trough 1 reaches the set value, the drain valve 211 is turned off, and an ultraviolet lamp is illuminated for a predetermined duration, such as 3 min. The long-acting sterilization of the water in the mist collecting space 42 is realized, then the atomizer 7 starts to work to form water mist, the fan 6 drives the water mist to be blown out of the humidifier, and the humidification function is realized. During normal operation (i.e. when the quantity of water in the water trough 1 is sufficient, water replenishment is not required), the ultraviolet lamp works intermittently, for example, is lightened for 10 s every 50 s, real-time sterilization is realized, and good heat dissipation is realized. When the water level of the water trough 1 is lower than a set value after being consumed, the drain valve 211 is started to replenish water, and meanwhile, the ultraviolet lamp is lightened to sterilize, so that the newly replenished water is effectively sterilized, and the problem of secondary water pollution of the water trough 1 caused by Brownian motion of water molecules is effectively avoided. In addition, the humidifier controls the ultraviolet lamp when the water tank assembly 2 is lifted through the cooperation of the float 111 and the detection plate 112. For example, if the water tank assembly 2 is lifted during the operation of the humidifier, the float 111 moves away from the detection plate 112 along with the water tank assembly 2, the detection plate 112 is disconnected, and the ultraviolet lamp is immediately extinguished so as to prevent a user from being injured by ultraviolet radiation. It is to be noted that the above-mentioned ultraviolet lamp, detection plate 112 and solenoid valve 212 are electrically connected to the control portion 8 to realize linkage control.

In the humidifier, the ultraviolet lamp is placed near the atomizer 7, the ultraviolet lamp is matched with the mist collecting structure 4 to form a local sterilization space, so that the energy of the ultraviolet lamp is relatively concentrated, and the sterilization effect is good. Meanwhile, the ultraviolet light is irradiate directly atomized water at a short distance, the sterilization is more thorough, and the problem that bacteria are easy to breed in water in the water trough 1 is solved. Each corner of the water trough 1 is cleaned by taking up the water tank assembly 2 by a user in the using process, the ultraviolet lamp is linked with the drain valve 211 of the humidifier, the humidifier replenishes water to the water trough 1 through the water tank assembly 2 while the ultraviolet lamp is started to sterilize, the problem of secondary pollution caused by newly replenished water is thoroughly solved, and a better use experience is provided for the user.

Those skilled in the art easily understand that the above solutions is freely combined and superimposed on the premise of no conflict.

It should be understood that the above implementation manners are only exemplary, and not limiting, without departing from the basic principles of the disclosure. Those skilled in the art make various obvious or equivalent modifications or replacements for the above details, which will be included within the scope of the claims of the disclosure.

What is claimed is:

1. An air treatment device, comprising a water tank assembly, a water trough and a sterilization device, wherein the sterilization device comprises a sterilization portion, the sterilization portion is provided in the water trough, a water replenishing switch is provided between the water tank assembly and the water trough, the water replenishing switch is configured to control connection and disconnection between the water tank assembly and the water trough, the air treatment device further comprises a control portion, and the control portion is capable of controlling an opening and closing of the sterilization portion according to an on-off state of the water replenishing switch.

2. The air treatment device as claimed in claim 1, wherein the air treatment device further comprises a water level detection device for detecting a water level in the water trough, the control portion is capable of controlling the on-off state of the water replenishing switch according to the water level detected by the water level detection device.

3. The air treatment device as claimed in claim 2, wherein the air treatment device further comprises a humidifier.

4. The air treatment device as claimed in claim 1, wherein the water replenishing switch comprises a drain valve and a solenoid valve, the solenoid valve is connected to the control portion, the control portion is capable of controlling the solenoid valve to drive an action of the drain valve, so as to realize connection or disconnection between the water tank assembly and the water trough.

5. The air treatment device as claimed in claim 4, wherein the air treatment device further comprises a humidifier.

6. The air treatment device as claimed in claim 1, wherein the air treatment device further comprises an atomizer and a mist collecting structure, the mist collecting structure forming a mist collecting space, and at least a part of the sterilization portion is located in the mist collecting space.

7. The air treatment device as claimed in claim 6, wherein the air treatment device further comprises a humidifier.

8. The air treatment device as claimed in claim 1, wherein the air treatment device further comprises a humidifier.

9. The air treatment device as claimed in claim 1, wherein the air treatment device comprises a startup control process, and in the common operation control process,
when the water trough is in a water replenishing state and the water replenishing switch is in an on state, controlling the sterilization portion to be in a continuous working state; or,
when the water trough is in a normal water quantity state and the water replenishing switch is in an off state, controlling the sterilization portion to be in an intermittent working state; or,
when the water trough is in a water replenishing state and the water replenishing switch is in an on state, controlling the sterilization portion to be in a continuous working state, when the water trough is in a normal water quantity state and the water replenishing switch is in an off state, controlling the sterilization portion to be in an intermittent working state.

10. The air treatment device as claimed in claim 9, wherein the intermittent working state is that the sterilization portion works for a second duration every first duration.

11. The air treatment device as claimed in claim 10, wherein the air treatment device comprises a common operation control process, and in the startup control process,
when the air treatment device is changed from a shutdown state to a startup state, detecting a water level in the water trough;
if the water level in the water trough does not reach a set value, controlling the water replenishing switch to be turned on, when the water level in the water trough reaches the set value, controlling the water replenishing switch to be turned off, and controlling the sterilization portion to enter the common operation control process after working for a predetermined duration; and
if the water level in the water trough is higher than or equal to the set value, controlling the sterilization portion to enter the common operation control process after working for a predetermined duration.

12. The air treatment device as claimed in claim 11, wherein the predetermined duration is greater than the second duration.

13. The air treatment device as claimed in claim 9, wherein the air treatment device comprises an atomizer,
in the startup control process, the atomizer is in a closed state; and/or,
in the common operation control process, the atomizer is in an open state.

14. The air treatment device as claimed in claim 1, wherein when the water tank assembly is separated from the water trough, the sterilization device is closed.

* * * * *